United States Patent [19]
Goorhouse

[11] Patent Number: 4,528,949
[45] Date of Patent: Jul. 16, 1985

[54] FLUID INJECTION APPARATUS FOR INTERNAL COMBUSTION ENGINES

[76] Inventor: Donald E. Goorhouse, 7125 2nd St. #111, Scottsdale, Ariz. 85251

[21] Appl. No.: 691,415

[22] Filed: Jan. 14, 1985

[51] Int. Cl.³ ............................................. F02M 23/00
[52] U.S. Cl. ....................................... 123/26; 123/585
[58] Field of Search ................. 123/26, 531, 533, 539, 123/556, 559 R, 25 E, 25 F, 25 G, 25 J, 25 P, 585–590; 261/30, DIG. 51

[56] References Cited

U.S. PATENT DOCUMENTS

| Re. 26,169 | 3/1967 | Hall | 123/588 |
| 2,789,796 | 4/1957 | Mansfield | 123/539 |
| 2,899,185 | 8/1959 | Rector | 261/72 |
| 2,927,848 | 3/1960 | Baverstock | 261/30 |
| 2,983,267 | 5/1961 | Percival | 123/559 R |
| 3,074,697 | 1/1963 | Friedell | 261/16 |
| 4,051,815 | 10/1977 | Coberley | 123/25 A |
| 4,279,236 | 7/1981 | Dallman | 123/585 |
| 4,280,968 | 7/1981 | Smeets | 261/16 |
| 4,399,795 | 8/1983 | Brown | 123/527 |
| 4,476,817 | 10/1984 | Lindberg | 123/25 P |

OTHER PUBLICATIONS

Copending design patent application, Ser. No. 683,601, filed Dec. 19, 1984, Donald E. Goorhouse, Inventor, entitled Fluid Injection Apparatus for Internal Combustion Engines.

Primary Examiner—William A. Cuchlinski, Jr.
Attorney, Agent, or Firm—Warren F. B. Lindsley

[57] ABSTRACT

An apparatus for mounting between a carburetor and an air filter housing of an internal combustion engine which injects air streams into the carburetor at a point immediately adjacent its fuel jets for subjecting the normal air fuel mixture to additional turbulence for increased vaporization of the fuel supply.

9 Claims, 7 Drawing Figures

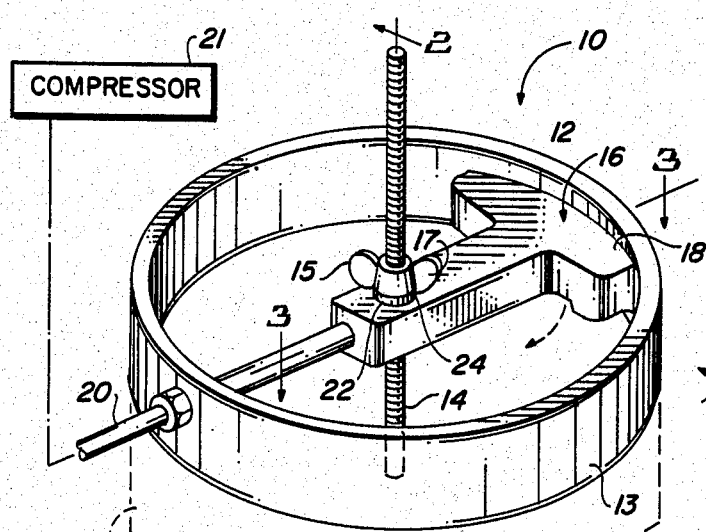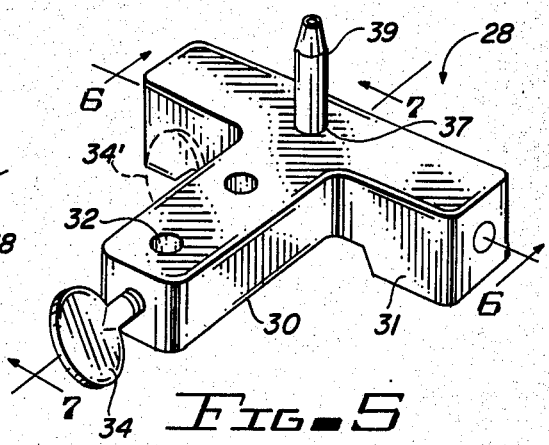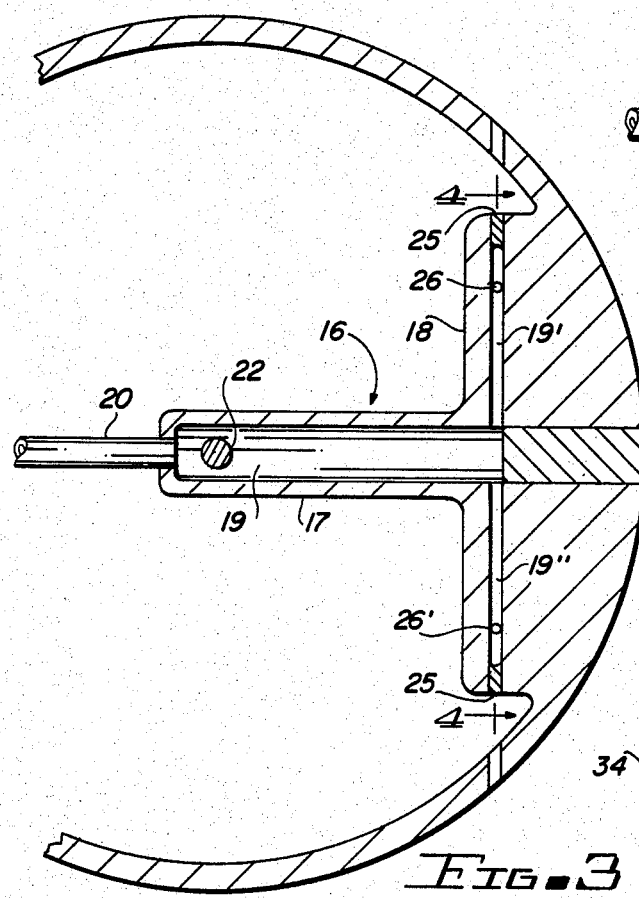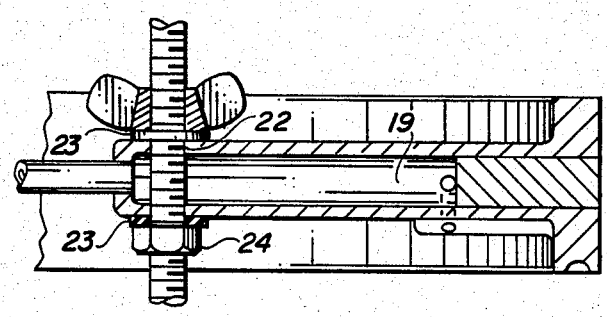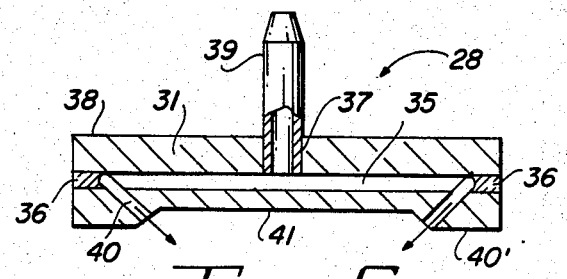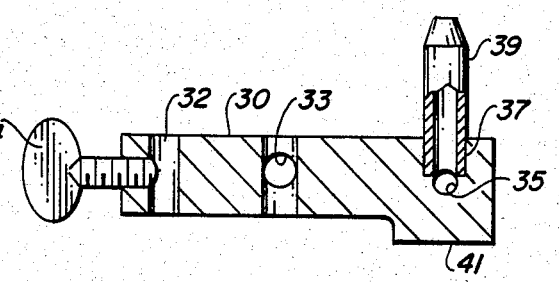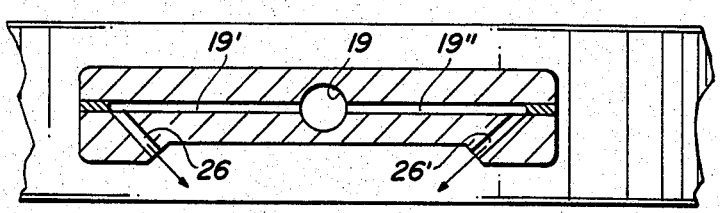

FLUID INJECTION APPARATUS FOR INTERNAL COMBUSTION ENGINES

BACKGROUND OF THE INVENTION

One of the most important parts of an internal combustion engine is its carburetor. Unless the carburetor performs well, the engine will not start reliably, will not run smoothly and deliver adequate power and good gasoline mileage, and will produce excessive atmospheric pollutants.

Because the proper operation of the carburetion system is so essential to total engine performance, much attention has been given in the past to carburetor design, and over the years the carburetor has become a complex device.

Furthermore, until recently there has been a greater emphasis on certain aspects of performance such as starting, acceleration and power developed with insufficient emphasis given to gasoline mileage and atmospheric polluting conditions.

Thus, a need exists for a new approach to the carburetor which will produce a better balance in total performance, and which provides in particular improved gas mileage and a lower level of atmospheric pollution.

DESCRIPTION OF THE PRIOR ART

There are two primary ways of providing a fuel and air mixture for combustion in a cylinder of an internal combustion engine. One way is to employ a carburetor in which a flow of air through its throat subjects the fuel to a low pressure created in the throat resulting in a flow of fuel and air into the manifold of the engine. The other way is to deliver a fuel-air mixture into the combustion chamber of a cylinder by injecting a quantity of fuel directly into an air stream. Fuel injection is a more precise method of achieving a correct fuel-air mixture in an engine than is carburetion, but it is also substantially more expensive.

U.S. Pat. No. 4,051,815 discloses an apparatus for vaporizing a fuel and injecting the vaporized fluid into a carburetor of an internal combustion engine by subjecting a flow of fluid to a flow of pressurized air. The flow of fluid includes fluid containing vaporized water.

SUMMARY OF THE INVENTION

In accordance with the invention claimed, a low profile horizontally positioned apparatus is disposed between the carburetor and the air filter on an internal combustion engine for not only injecting supplemental air under pressure into the carburetor for consumption purposes, but also to subject the fuel to turbulence for vaporization purposes.

It is, therefore, one object of this invention to provide a low profile supplemental air input apparatus for the carburetor of an internal combustion engine which increases gas expansion and air turbulence in the carburetor over that of known prior art designs.

Another object of this invention is to provide an improved low profile supplemental air input apparatus mounted on top of a carburetor, the top part of which is covered by the air filter, thereby keeping the gasoline and bottom part of the carburetor relatively cool for better performance.

A further object of this invention is to provide a device for injecting supplemental air under pressure into a carburetor above its needling jets causing turbulence in the fuel supply that insures more effective vaporization and burning of the fuel in the cylinders of the internal combustion engine.

A still further object of this invention is to provide a supplemental air supply for a carburetor in which all fuel mixing is accomplished ahead of the throttle plate, thereby realizing a more uniform distribution of fuel throughout the air body.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of a device for providing a supplemental air supply under pressure to a carburetor shown in dash lines of an internal combustion engine embodying the invention;

FIG. 2 is a cross-sectional view of FIG. 1 taken along the line 2—2;

FIG. 3 is a cross-sectional view of FIG. 1 taken along the line 3—3;

FIG. 4 is a cross-sectional view of FIG. 3 taken along the line 4—4;

FIG. 5 is a perspective view of a modification of the air mixing distributor shown in FIG. 1;

FIG. 6 is a cross-sectional view of FIG. 5 taken along the line 6—6; and

FIG. 7 is a cross-sectional view of FIG. 5 taken along the line 7—7.

DESCRIPTION OF THE PREFERRED EMBODIMENT

Referring more particularly to the drawing by characters of reference, FIGS. 1-5 disclose a device or apparatus 10 for providing a supplemental supply of air under pressure to a carburetor 11, diagrammatically shown in dash lines. Apparatus 10 is arranged for mounting on the top of the carburetor with the carburetor and apparatus rigidly secured between a conventional throttle plate of a manifold of an internal combustion engine and an open centered disc-shaped air filter housing (not shown). Details of the carburetor and air filter, both well known in the art, are not shown for simplicity of illustration.

The air filter housing fits over and around or on the top surface 12 of an annular ring 13 forming a part of apparatus 10. The air filter housing and annular ring 13 of apparatus 10 are secured to the top surface of a carburetor by a long vertically oriented machine screw 14 and nut 15 normally used for securing the air filter housing to an air horn of a carburetor when the carburetor is mounted on the manifold of an internal combustion engine.

As shown in FIGS. 1 and 3, an air manifold or distributor 16 is mounted inside of annular ring 13 for distribution of air under pressure to the associated carburetor 11. As noted from FIG. 3, distributor 16 may be formed or molded as a part of annular ring 13 and comprises a T-shaped configuration with its leg 17 and cross-arm 18 forming internally thereof air passageways 19, 19' and 19". As shown in FIGS. 1 and 3, passageway 19 in leg 17 is connected to a conduit 20 which extends through the periphery of ring 13 and is connected to a source of air under pressure such as, for example, compressor 21. As shown in FIGS. 1 and 2, machine screw 14 extends through an opening 22 and passage 19 of distributor 16 with machine screw 14 being maintained in a fluid tight arrangement in opening 22 by washers 23, nut 24 and wing nut 15.

As noted from FIG. 3, passageway 19 may be molded or drilled into leg 17 of the T-shaped configuration of distributor 16 from the free end thereof. Passageways 19' and 19" may be drilled into the free ends of cross arm 18 of the T-shaped configuration by drilling through annular ring 13 in coaxial alignment with the axis of cross-arm 18.

In order to close the open ends of passageways 19' and 19", plugs 25 formed of a suitable resilient material are inserted, one in each end thereof, as shown in FIG. 3, to seal the passageway from the atmosphere.

At this point, a pair of nozzles 26, 26' are drilled into the ends of cross-arm 18 connecting passageways 19', 19" with the atmosphere. These nozzles are angularly disposed to the longitudinal axis of passageways 19', 19" and extend outwardly therefrom in the manner disclosed in FIG. 4 so as to cause air streams under pressure dispensed therefrom to cross inside of an associated carburetor 11 immediately above its fuel jets.

Thus, air under pressure issuing from nozzles 26, 26' at a high velocity and relatively low pressure forms a turbulence in the normal air and fuel flow thereby vaporizing the gasoline more thoroughly than heretofore possible which is essential to efficient engine performance.

The normal air and gasoline mixture resulting from the main air flow through the air filter housing is supplemented by the air flow through distributor 16 and the resulting air turbulence resulting from the specific construction and positioning of nozzles 26, 26' produces through mixing of the fuel for more efficient combustion in the cylinders of an associated internal combustion engine.

Although FIGS. 1-4 illustrate the distributor and ring configuration as a unitary structure, the distributor can be manufactured individually and mounted separately on machine screw 14 to perform the same function as apparatus 10.

As shown in FIGS. 5-7, apparatus 28 comprises a distributor of a T-shaped configuration having a leg 30 and cross-arm 31 which configuration is provided with openings 32, 33 extending laterally through leg 30 for receiving machine screw 14 in either one of the openings for fastening the distributor via thumb screws 34, 34' on or above the carburetor and between it and the usual air filter housing.

Cross-arm 31 is provided with a passageway 35 drilled or molded to extend axially therethrough, as shown in FIG. 6, the ends of which are closed or sealed with suitable plugs 36 which may be formed of a resilient material.

In this embodiment, an opening 37 is drilled or molded to extend through the top surface 38 of the distributor into communication with passageway 35. A suitable bushing 39 is inserted into opening 37 in a fluid tight arrangement for use in attaching it to a hose of compressor 21.

Discharge nozzles 40, 40' are then drilled or molded in a lower surface 41 of device 28 in the manner shown so as to direct air under pressure issuing therefrom in the manner of nozzles 26, 26' of FIGS. 1-4 to cross at a predetermined point in an associated carburetor above its fuel jets for creating a turbulence in the fuel supply in the manner heretofore described.

Although but two embodiments of the present invention have been illustrated and described, it will be apparent to those skilled in the art that various changes and modifications may be made therein without departing from the spirit of the invention or from the scope of the appended claims.

What is claimed is:

1. An apparatus for injecting air under pressure into a carburetor of an internal combustion engine comprising:
   a distributor having a T-shaped configuration,
   said configuration having a leg and a cross-arm,
   said leg having an opening extending laterally therethrough for receiving a machine screw used for fastening an air filter housing to the carburetor,
   a passageway extending at least partially through said cross-arm longitudinally thereof,
   means for connecting said passageway to a source of fluid under pressure, and
   a pair of nozzles one formed in each end of said cross-arm and extending laterally of its longitudinal axis for interconnecting the ends of said passageway with atmosphere on the same side of said cross-arm,
   the longitudinal axis of said nozzles being arranged to intersect at a predetermined point outside of said apparatus.

2. The apparatus set forth in claim 1 wherein:
   the longitudinal axis of said nozzles intersect at a point inside of the associated carburetor.

3. The apparatus set forth in claim 1 wherein:
   said means is on the other side of said cross-arm from said nozzles.

4. The apparatus set forth in claim 1 wherein:
   said passageway extends through said cross-arm, and
   plug means are provided one for each end of said passageway.

5. The apparatus set forth in claim 1 in further combination with:
   a ring for mounting on the top surface of a carburetor with said machine screw extending axially therethrough, and
   means for securing said distributor to the inside periphery of said ring with said arm and cross-arm lying in a plane extending substantially perpendicular to the axis of said ring.

6. An apparatus for injecting air under pressure into a carburetor of an internal combustion engine comprising:
   a ring for mounting on the top surface of a carburetor in a position such that a machine screw used for fastening an air filter housing to the carburetor can extend axially therethrough,
   a distributor having a T-shaped configuration mounted within said ring,
   said configuration comprising a leg and cross-arm with said cross-arm being attached along an edge thereof to the inside periphery of said ring and said leg lying in a plane substantially perpendicular to the axis of said ring,
   said leg having an opening extending therethrough for receiving said machine screw,
   a first passageway extending in said cross-arm longitudinally thereof,
   a second passageway extending axially through said leg and connected at one end to said first passageway and being connectable at its other end to a source of air under pressure, and a pair of nozzles, one formed in each end of said cross-arm and extending laterally of its longitudinal axis for interconnecting the ends of said first passageway with the atmosphere on the same side of said cross-arm, the axes of said nozzles being arranged to intersect at a predetermined point outside of said apparatus and inside of the associated carburetor.

7. The apparatus set forth in claim 6 wherein: said distributor is formed integral with said ring.

8. The apparatus set forth in claim 6 in further combination with:

a conduit connected at one end to the other end of said second passageway with its other end extending through said ring.

9. The apparatus set forth in claim 8 wherein:

said leg and cross-arm of said distributor and said conduit lie in a plane coplanar with the edges of said ring.

* * * * *